United States Patent
Takeuchi

(10) Patent No.: US 7,453,248 B2
(45) Date of Patent: Nov. 18, 2008

(54) SWITCHING POWER SUPPLY DEVICE

(75) Inventor: Toshirou Takeuchi, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 0 days.

(21) Appl. No.: 11/616,493

(22) Filed: Dec. 27, 2006

(65) Prior Publication Data
US 2007/0145956 A1 Jun. 28, 2007

(30) Foreign Application Priority Data
Dec. 28, 2005 (JP) ............................. 2005-378930

(51) Int. Cl.
G05F 1/00 (2006.01)
G05F 5/00 (2006.01)
(52) U.S. Cl. ...................... 323/285; 323/284; 323/301
(58) Field of Classification Search ................ 323/207, 323/222, 281, 282, 284, 285, 290, 299, 301, 323/351
See application file for complete search history.

(56) References Cited
U.S. PATENT DOCUMENTS

| | | | |
|---|---|---|---|
| 6,191,565 B1 * | 2/2001 | Lee et al. ................. | 323/222 |
| 6,373,735 B2 * | 4/2002 | Usui ........................ | 363/89 |
| 6,657,417 B1 * | 12/2003 | Hwang .................... | 323/222 |
| 6,903,536 B2 * | 6/2005 | Yang ....................... | 323/266 |
| 6,946,819 B2 * | 9/2005 | Fagnani et al. ........... | 323/207 |
| 6,967,851 B2 * | 11/2005 | Yang et al. ............... | 363/16 |
| 6,984,963 B2 * | 1/2006 | Pidutti et al. ............ | 323/207 |
| 7,064,527 B2 * | 6/2006 | Adragna .................. | 323/207 |
| 2006/0113976 A1 * | 6/2006 | Bernardon ............... | 323/282 |

FOREIGN PATENT DOCUMENTS
JP 2001-119956 4/2001

\* cited by examiner

*Primary Examiner*—Jessica Han
*Assistant Examiner*—Emily Pham
(74) *Attorney, Agent, or Firm*—Oblon, Spivak, McClelland, Maier & Neustadt, P.C.

(57) ABSTRACT

A switching power supply device has a boost power converter which converts a wide range of AC input voltages into a DC voltage larger than an amplitude of the AC input voltage to supply to a DC-DC converter. The switching power supply device includes a load detection circuit, an input voltage detection circuit, and a power conversion controller for the boost power converter. The power conversion controller corrects the determination reference value in accordance with the AC input voltage detected in the input voltage detection circuit. When a light load is detected based on a comparison between the corrected determination reference value and the detection value output from the load detection circuit, the controller disables the boost power converter.

8 Claims, 14 Drawing Sheets

SWITCHING POWER SUPPLY DEVICE

BACKGROUND OF THE INVENTION

The present invention relates to a switching power supply device that includes a boost power converter capable of correcting a power factor. More particularly, the invention relates to an active power-factor correction device (PFC device) circuit capable of correcting a power factor in response to power consumption in an external load.

In response to the global trend of energy savings, efforts to use energy more efficiently have been expended. To save energy, the IEC (the International Electrotechnical Commission) has defined a series of standards for power supply devices for use in electric appliances or equipment. The standards include the IEC-1000s related to harmonic components in a current in a power supply device. In addition, the environmental protection agency's (EPA's) specifications, the so-called ENERGY STAR, require to attain average power conversion efficiency of 84% or greater at each of output load factors of 25%, 50%, 75%, and 100%.

Power factor correction has come into wider use to solve problems related to harmonic components in a current in a power supply device, and a PFC circuit has been incorporated into a power supply device. FIG. 1 is a circuit diagram of a related switching power supply device that incorporates a PFC circuit. An AC input voltage supplied from an AC power supply 1 is rectified by a rectifier 2. The PFC circuit 3 shapes a wave form of an input current rectified in the rectifier 2 into a waveform which is proportional to that of an input voltage, thereby correcting a power factor, and suppressing harmonic components in the current. A DC-DC converter 4 converts a DC voltage supplied from the PFC circuit 3 into a high-frequency voltage by performing on-off switching using a switching element Q2 via a primary winding P1 in a transformer T1. Subsequently, the DC-DC converter 4 rectifies and smoothes the high-frequency voltage induced at a secondary winding S1 to a diode D2 and a capacitor C2, thereby converting into a DC voltage required by an appliance serving as a load 5. A control circuit 41 turns on and off the switching element Q2 so that an output of the DC-DC converter 4 (a voltage across the capacitor C2) attains a predetermined output voltage.

The PFC circuit 3 includes a first series circuit, a second series circuit, and a PFC control circuit 32. The first series circuit is connected to two ends of the rectifier 2, and includes a reactor L, the switching element Q1 having a MOSFET and the like, and a resistor R1. The second series circuit connects a drain and a source of the switching element Q1, and includes a diode D1 and a capacitor C1. Drive power for the PFC control circuit 32 is supplied from the DC-DC converter 4. Based on an AC input voltage supplied from the rectifier 2, an output voltage of the capacitor C1, and a voltage that depends on a current flowing through the resistor R1, the PFC control circuit 32 performs on-off switching of the switching element Q1 so that an AC input current is proportional to the AC input voltage and that the output voltage of the capacitor C1 attains a predetermined voltage.

FIG. 2 is a circuit diagram of the PFC control circuit of the switching power supply device shown in FIG. 1. The PFC control circuit 32 comprises an error amplifier 321, a multiplier 322, a current detector 323, a current error amplifier 324, and a PWM control circuit 325. An output voltage Vdc of the capacitor C1 is divided through resistors R4 and R5. The error amplifier 321 produces a signal for amplifying an error between the thus-obtained fraction of the voltage Vdc and a predetermined reference voltage Vr. An AC input voltage Vac supplied from the rectifier 2 is divided through resistors R2 and R3. The multiplier 322 multiplies the signal from the error amplifier 321 and the thus-obtained fraction of the AC input voltage Vac, thereby generating a target value of a reactor current of the reactor L. The current detector 323 detects a current flowing through the resistor R1, that is, a current flowing through the reactor L. The current error amplifier 324 compares the target value and an average current value provided from the current detector 323. The PWM (pulse-width modulation) control circuit 325 compares a result of a comparison outputted from the current error amplifier 324 and a sawtooth-waveform signal, and controls on-off operations of the switching element Q1 in accordance with the result of the comparison so that an AC input current that is proportional to both the AC input voltage and the control signal provided from the error amplifier 321 is obtained.

The PFC circuit 3 shown in FIG. 1 is of an active type, and continuously consumes electric power when the power supply device is supplied with an AC input from the AC power supply 1. Therefore, when an external load of the DC-DC converter 4 is light, the power supply device is decreased in power conversion efficiency. For example, an electrical appliance such as a television set which has a function of a standby mode is continuously used for a considerably long period of time in the standby mode while using only 10% or smaller amount of power of that used in a normal operation mode. Reduction in the power conversion efficiency at such a load condition is a problem in advancement energy saving in the same manner as does the conversion for a steady load.

Japanese Patent Application Laid-Open No. 2001-119956 has proposed a power supply device including a PFC circuit improved in conversion efficiency in a light load mode or a standby mode. The device includes a PFC circuit that actively controls power factor correction in response to an increase of power consumption in an external load. The above-mentioned power factor correction circuit comprises a converter that converts electric power and provides the power to a DC converter, a power factor correction control unit that controls power conversion by the converter, and a load detection unit. The load detection unit detects power consumption in the DC converter by an external load, and enables the power factor correction control unit when the power consumption exceeds a predetermined power level.

SUMMARY OF THE INVENTION

While power factor correction circuits are capable of active control of power factor correction in response to an increase of power consumption in an external load, a nominal-rated voltage for an AC power supply varies greatly depending on a country (e.g., 100 VAC in Japan, 115 VAC in U.S., and 230 VAC in European countries). Therefore, it has been difficult for a power supply device, which is adaptable to different nominal AC supply voltages of various countries, to enable a PFC circuit when a load power reaches a predetermined level in response to an increase of power consumption in an external load and to disable the PFC circuit when a load power falls to the predetermined level or lower in response to a decrease of power consumption in the external load, while improving power conversion efficiency at each rated load (or steady load) over the wide range of input voltage.

Detection of a level of power supplied to the load 5 at a secondary side of the DC-DC converter 4 enables accurate control of the PFC circuit 3 independent of an AC input voltage. However, in a method of detecting a level of load power at the secondary side, generally a large quantity of current is supplied in a normal operation mode, which increases a power loss in a power detection circuit. When a current transformer is employed to suppress the power loss in the power detection circuit, a large space and great cost are required. Since this method requires additional components to transmit a signal from the secondary side to a primary side, a larger space and greater cost are required, which makes miniaturization and cost reduction difficult.

An alternative method of detecting a level of load power at the primary side may solve the problem pertaining to power detection at the secondary side. However, power levels detected at the primary side are not in complete proportion to actual output power levels because of variations in an input voltage. Since detected load power levels for use in determination as to enabling or disabling the PFC circuit thus vary due to variations in the input voltage, enabling or disabling the PFC circuit fails within a rated power in some cases. In particular, when a load condition is detected based on a duty ratio of a control signal of a switching element in a PFC circuit or when a control operation is performed to vary an output voltage in accordance with a variation in an input voltage to maximize conversion efficiency at a small input voltage, variations in an input voltage result in significantly deviated detection of a load power. Since turning on and off of the PFC circuit is disabled in a given load condition, power conversion efficiency in a standby or light-load mode is extremely deteriorated to fail to meet the EPA's specifications that require average power conversion efficiency of 84% or greater at each of output load factors of 25%, 50%, 75%, and 100%.

Since the relevant power supply device uses the active PFC circuit, switching losses in a switching element or losses in an electronic circuit controlling the switching element deteriorate the overall power efficiency under light load condition. When boost in the PFC circuit to an output voltage; e.g., 400 VDC (although a general output voltage is approximately 380 VDC, 400 VDC is assumed in this example) from a 115 VAC input and that from a 230 VAC input are compared, the boost voltage ratio is larger in the former one. Hence, on-periods in boost from the input voltage of 115 VAC to the output voltage of 400 VDC are lengthened and off-periods is significantly shortened. Consequently, a power loss is increased (power losses increase in proportion to current squared) due to an increase of an input current to the PFC circuit, thereby deteriorating the efficiency.

As a method of minimizing the loss in the PFC circuit, the boost voltage ratio may be suppressed low. To suppress the boost voltage ratio low, it is necessary to vary an output of the PFC circuit in accordance with an AC input voltage. An output voltage of the PFC circuit must be set to a value higher than a peak value of the input voltage so as to enable PFC operations. For example, a PFC output for a 115 VAC input is set to an approximately 200 VDC (although a general PFC output is approximately 250 VDC, this example assumes 200 VDC), and a PFC output for a 230 VAC input is set to an approximately 400 VDC. When a power level of the DC-DC converter is detected at the primary side without directly detecting an output current of the DC-DC converter while suppressing a boost voltage ratio low, it is not easy to detect the output voltage. In the method of detecting the primary current, the primary voltage varies, and hence a power level cannot be obtained through a simple calculation. To obtain the power level, the current value and a voltage value must be multiplied.

Even when an on-period or a duty ratio of the switching element of the DC-DC converter is detected, or, alternatively, a feedback voltage for use in a control operation for causing the output voltage to attain a predetermined voltage is detected, an output voltage of the PFC circuit, that is, an input voltage of the DC-DC converter varies. Therefore, output power levels that are affected by the variations in the input voltage are not directly proportional to duty ratios.

FIG. 3 shows relationships between input voltage load factors and duty ratios of a DC-DC converter. For the sake of the clarity, the DC input voltages and the duty ratios of the switching element of the DC-DC converter are simplified.

The load detection circuit detects a load condition based on a duty ratio of a drive signal for the switching element of the DC-DC converter. Load power levels of the DC-DC converter and the duty ratios of the drive signals for the switching element of the DC-DC converter are substantially proportional irrespective of corresponding AC input voltages so long as DC input voltages of the DC-DC converter are constant. Accordingly, when a load power level is determined, a duty ratio of the switching element of the DC-DC converter is also determined, which eliminates variations in a detection point due to variations in an AC input voltage.

However, when there is employed such a configuration that an output voltage of the PFC circuit is varied based on an AC input voltage so as to maximize the efficiency of the PFC circuit, an output voltage of the PFC circuit, that is, an input voltage of the DC-DC converter, is varied in accordance with the AC input voltage. Therefore, as shown in FIG. 4A, duty ratios of drive signals of the switching element of the DC-DC converter, when a duty ratio at 100% load of 200 VDC input is set to 50%, a duty ratio at 100% load of 400 VDC input is 25%. As described above, a duty ratio at which a given power is outputted varies for different AC input voltages even at a constant load power level. When a comparison reference value for a load detection circuit is fixed, it is possible to fail in determination at a predetermined load power level due to variations in an AC input voltage, which can inhibit turning on and off of a PFC circuit in accordance with a load power level.

FIG. 4B shows variations of duty ratios of the DC-DC converter in relation with variations in an input voltage of the DC-DC converter. When the PFC circuit is set so as to be turned on at 80% load at 115 VAC input or 200 VDC input and turned off of the 200 VDC input and turned off at a duty ratio of 25%. When the same duty ratio is adopted to a case of a 230 VAC input or 400 VDC input, the PFC circuit with the 230 VAC input is not turned on until the load reaches 160%, that is, the PFC circuit is constantly off. Accordingly, power factor correction is disabled, thereby failing to fulfill the IEC-1000s.

On the other hand, when the PFC circuit is set so as to be turned on at 80% load of a 230 VAC, or 400 VDC, input, the duty ratio is 20%. Therefore, the PFC circuit is turned on at 40% load of a 115 VAC input. When the PFC circuit is set so as to be turned off at 50% load of a 230 VAC, or 400 VDC, input, the duty ratio is 12.5%. Therefore, the PFC circuit is turned off at 25% load of a 115 VAC input.

When the PFC circuit is enabled over a range including even a light-load condition as described above, power conversion efficiency in a light-load mode is deteriorated to fail to meet the EPA'S specifications that require average power conversion efficiency of 84% or greater at each of output load factors of 25%, 50%, 75%, and 100%.

According to the present invention, a switching power supply device including a PFC circuit that is capable of actively controlling power factor correction in response to an increase of power consumption in an external load can be provided, and that performs power factor correction under a load condition adequate for each input voltage of over a wide range of AC input voltage, thereby meeting requirements with regard to harmonic components in a current and improving power conversion efficiency at light load.

According to a first technical aspect of the invention, a switching power supply device includes a boost power converter that converts an AC input voltage into a DC voltage larger than an amplitude of the AC input voltage to supply to a DC-DC converter. The switching power supply device includes: a load detection circuit that detects a load condition of the switching power supply device; an input voltage detection circuit that detects the AC input voltage; and a power conversion controller that controls whether to enable or disable the boost power converter based on a comparison between the detected load condition and a first reference value. The power conversion controller corrects the first reference value in accordance with the detected AC input voltage. When the detected load condition is determined to be a light load, the power conversion controller disables the boost power converter.

According to a second technical aspect of the invention, the switching power supply device according to the first aspect is further configured such that, when the detected AC input voltage exceeds a second reference value, the power conversion controller corrects the first reference value in accordance with the AC input voltage.

According to a third technical aspect of the invention, the switching power supply device according to the first aspect is further configured such that the power conversion controller corrects the first reference value so as to have a positive correlation with the detected AC input voltage.

According to a fourth technical aspect of the invention, the switching power supply device according to the first aspect is further configured such that the input voltage detection circuit is provided with an auxiliary winding wound around a reactor included in the boost voltage converter, and detects a voltage induced at the auxiliary winding during a boost, thereby detecting a boost voltage in the reactor.

DESCRIPTION OF THE PREFERRED EMBODIMENTS

Embodiments of a switching power supply device according to the present invention will be explained below in detail with reference to the drawings. The switching power supply device in the embodiments will be explained with an example of an AC-DC converter having a PFC circuit.

First Embodiment

Figure 5:
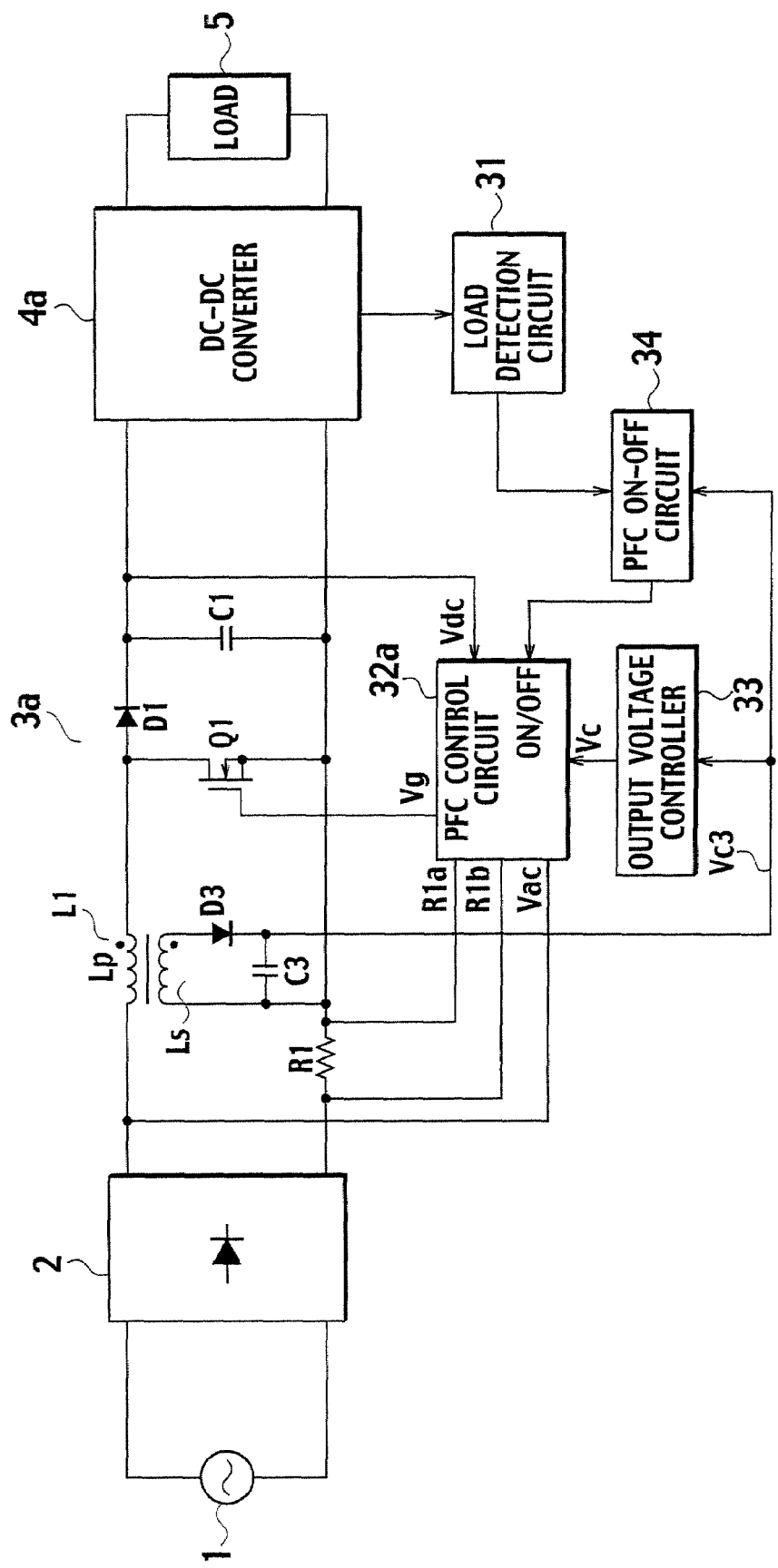
FIG. 5 is a circuit diagram of a switching power supply device according to a first embodiment of the present invention.

FIG. 5 is a circuit diagram of a switching power supply device according to a first embodiment of the present invention. In the switching power supply device shown in FIG. 5, the rectifier 2 rectifies an AC input voltage supplied from the AC power supply 1, and outputs the voltage to a PFC circuit 3a. The PFC circuit 3a converts from AC as pulsating wave into DC, and shapes a waveform of the input current rectified in the rectifier 2 so that a waveform of the input current is proportional to that of the input voltage, thereby correcting a power factor and suppressing harmonic components in a current.

A DC-DC converter 4a converts an output voltage of the PFC circuit 3a into a predetermined voltage to be fed to the load 5. The load detection circuit 31 detects power consumption by the external load 5 of the DC-DC converter 4a. A PFC on-off circuit (power conversion controller) 34 provides an ON signal or an OFF signal to the PFC control circuit 32a so as to enable the PFC control circuit 32a when the power consumption detected by the load detection circuit 31 exceeds a predetermined level and disable the PFC control circuit 32a when the power consumption is lower than the predetermined level.

The PFC circuit 3a includes a first series circuit, a second series circuit, and the PFC control circuit 32a. The first series circuit comprises a reactor Lp, the switching element Q1 including a MOSFET, and the resistor R1, and is connected to two output ends of the rectifier 2. The second series circuit comprises the diode D1 and the capacitor C1, and is connected to the drain and the source of the switching element Q1. Based on the AC input voltage Vac supplied from the rectifier 2, an output voltage Vdc supplied from the capacitor C1, and a voltage corresponding to a current flowing through the resistor R1, the PFC control circuit 32a performs on-off switching of the switching element Q1 so that an AC input current is proportional to the AC input voltage and that the output voltage of the capacitor C1 (output voltage of the PFC circuit) attains a predetermined voltage.

The PFC circuit 3a detects a representative voltage of an AC input voltage (e.g., a 115 VAC or 230 VAC input) and varies a PFC output voltage in which a boosted voltage value at the reactor Lp is detected instead of detecting the AC input voltage. More specifically, an auxiliary winding Ls is wound around the reactor Lp by electromagnetic coupling thereto. The auxiliary winding Ls is included in an input voltage detection circuit according to the present invention. The boosted voltage value is detected by detecting a voltage induced at the auxiliary winding Ls during a boost. Both ends of the auxiliary winding Ls are connected to a series circuit of a diode D3 and a capacitor C3. A connection point between a cathode of the diode D3 and one end of the capacitor C3 is connected to an input terminal of an output voltage controller 33 and an input terminal of the PFC on-off circuit 34, respectively. The other end of the capacitor C3 is connected to one end of the resistor R1.

The output voltage controller 33 receives a voltage Vc3, which corresponds to a boost voltage in the reactor Lp and which is detected using the auxiliary winding Ls through the diode D3. When the boost voltage Vc3 exceeds a predetermined voltage value, the output voltage controller 33 determines that the AC input voltage is small, and sets the PFC output voltage to a small predetermined value. When the boost voltage Vc3 is lower than the predetermined voltage value, the output voltage controller 33 determines that the AC input voltage is large, and sets the PFC output voltage to a large predetermined value.

Figure 1:
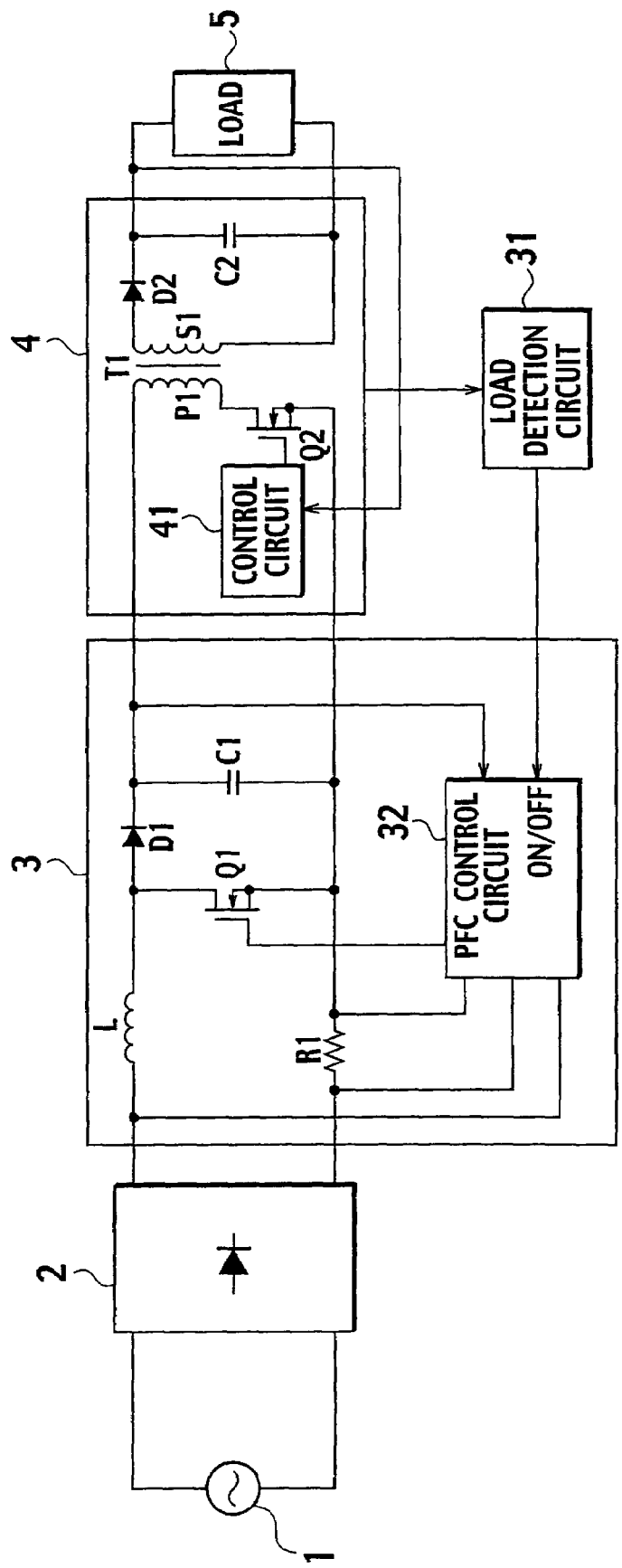
FIG. 1 is a circuit diagram of a related switching power supply device incorporating a PFC circuit.
Figure 2:
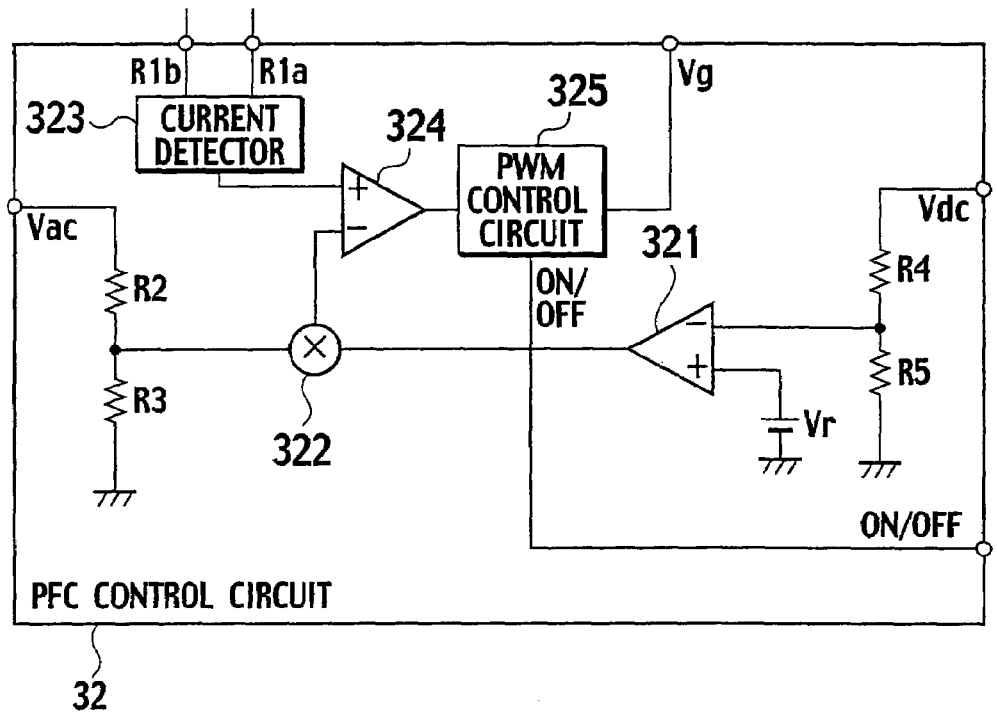
FIG. 2 shows a specific example of a PFC control circuit of a related switching power supply device.
Figure 3:
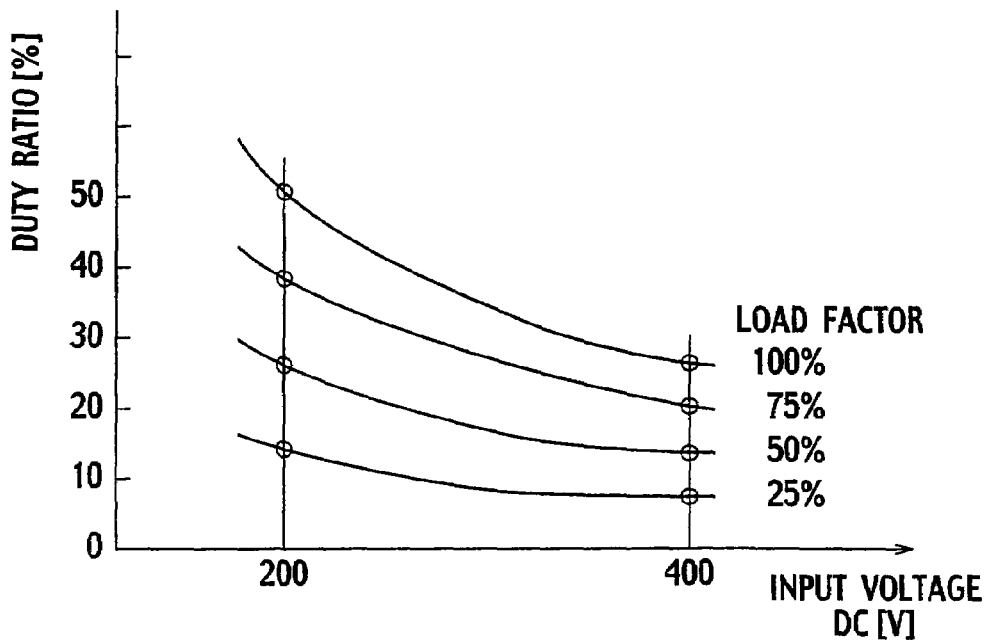
FIG. 3 shows relationships between load factors of input voltages of a DC-DC converter and duty ratios.
Figure 4A:
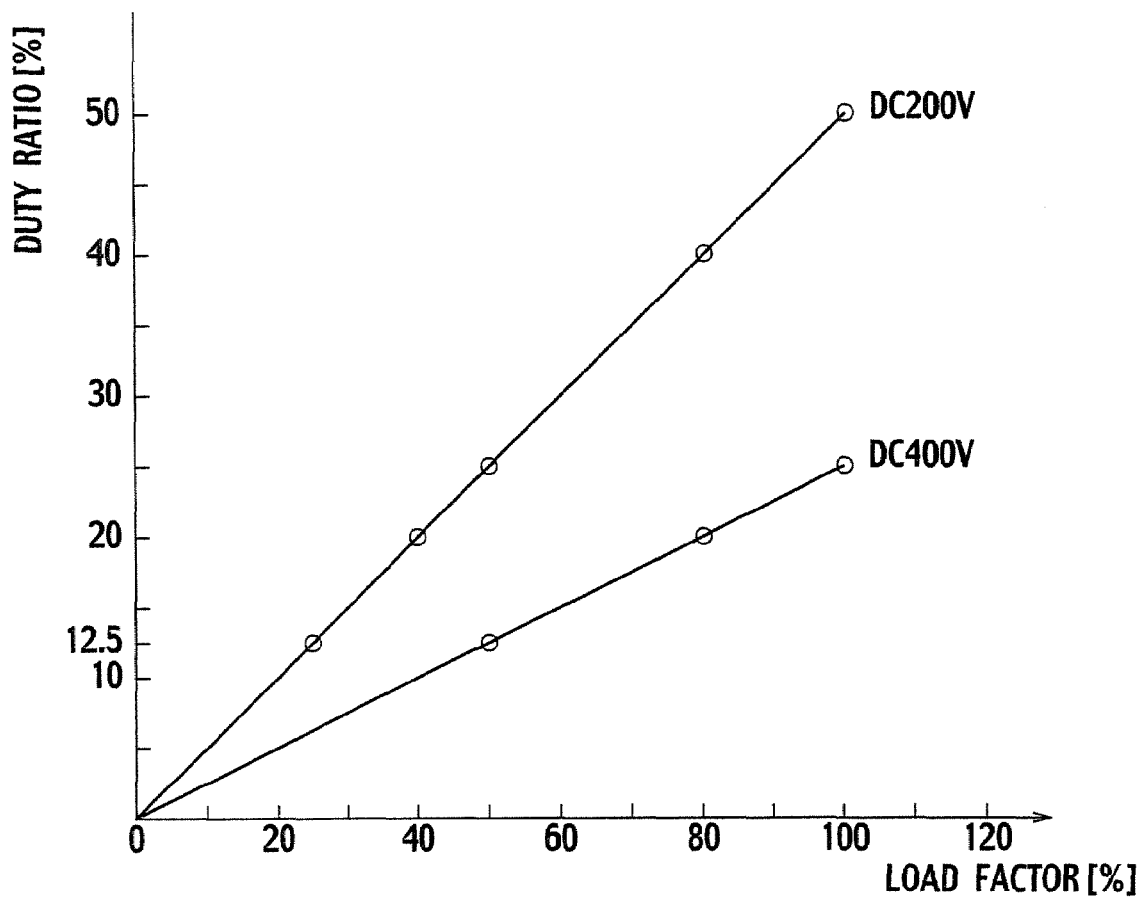
FIG. 4A shows changes of duty ratios and FIG. 4B shows on-off switching of a PFC function in relation to input voltages and loads.
Figure 4B:
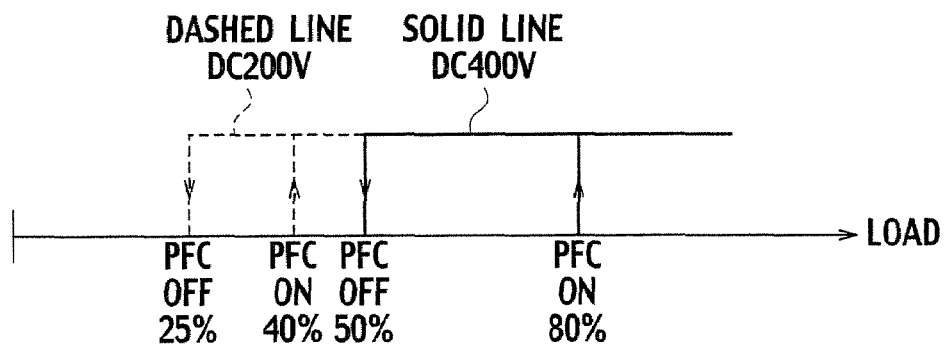
Figure 6:
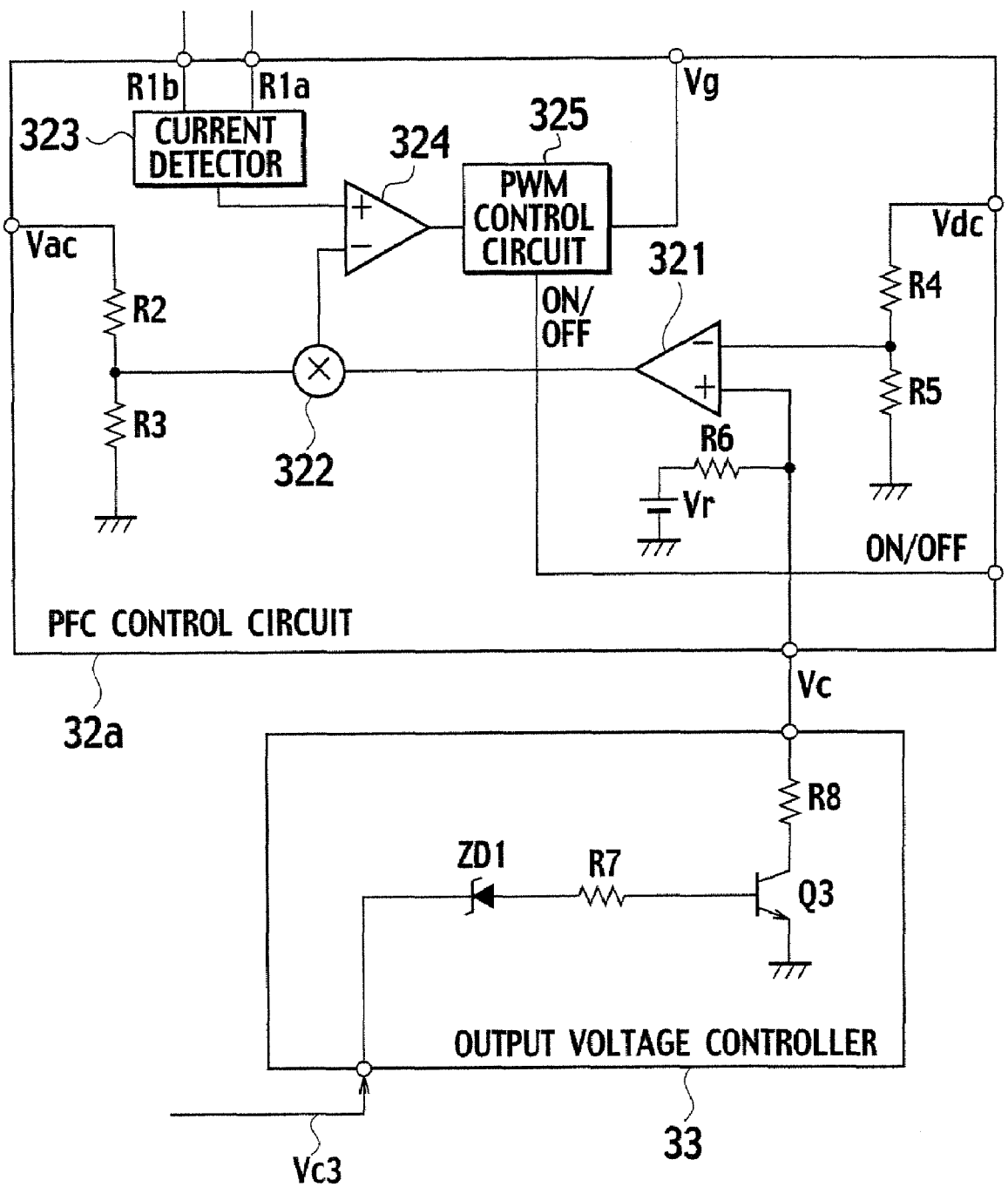
FIG. 6 shows a PFC control circuit and an output voltage controller of the first embodiment.

FIG. 6 is a diagram of a specific example of the PFC control circuit and the output voltage controller of the present embodiment. The PFC control circuit 32a shown in FIG. 6 differs in configuration from the PFC control circuit 32 shown in FIG. 2 in further including a resistor R6 between the reference voltage source Vr and the non-inverting terminal of an error amplifier 321. In the output voltage controller 33, a collector of a transistor Q3 is connected to a connection point at which the resistor R6 and the non-inverting terminal of the error amplifier 321 are connected to each other via a resistor R8, and an emitter is grounded. A base of the transistor Q3 is connected to an anode of a Zener diode ZD1 via a resistor R7, while a cathode of the diode ZD1 receives the boost voltage Vc3 supplied from the auxiliary winding Ls.

According to this configuration, when the AC input voltage is large and the boost voltage Vc3 is small, the voltage across the auxiliary winding Ls is small. Therefore, the transistor Q3 is turned off and the reference voltage Vr is applied to the non-inverting terminal of the error amplifier 321, which increases an output voltage of the PFC. On the other hand, when the AC input voltage is small and the boost voltage Vc3 is large, the voltage across the auxiliary winding Ls is large. Therefore, the transistor Q3 is turned on and a current flows from the reference voltage source Vr through the resistors R6 and R8 to the transistor Q3. Accordingly, a fraction of the reference voltage Vr divided through the resistors R6 and R8 is applied to the non-inverting terminal of the error amplifier 321, which decreases the PFC output voltage.

As described above, because of being capable of varying the output voltage of the PFC circuit 3a in accordance with an AC input voltage, the PFC circuit 3a provides a high power conversion efficiency even with a small AC input voltage, thereby improving power conversion efficiency of the PFC during operations.

Figure 7:
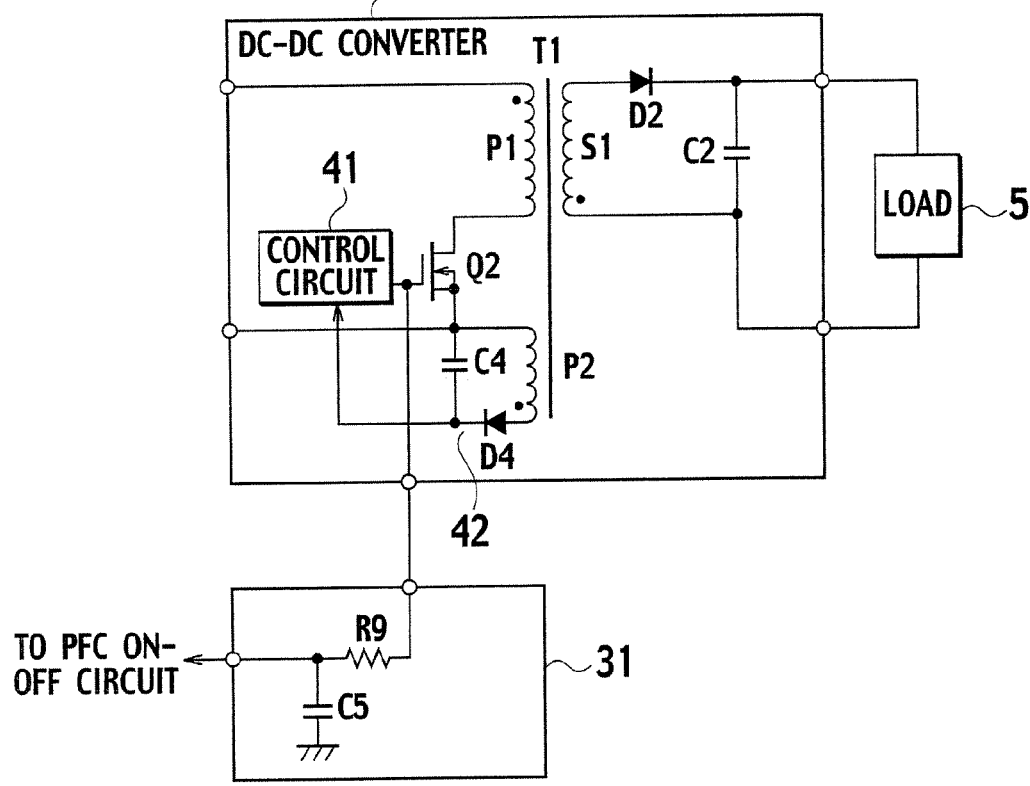
FIG. 7 shows a load detection circuit and a DC-DC converter of the first embodiment.

FIG. 7 shows a specific example of the load detection circuit and the DC-DC converter of the present embodiment. The DC-DC converter 4a includes a control circuit power supply 42, where a diode D4 and a capacitor C4 rectify and smooth a voltage induced at an auxiliary winding P2, which is connected with the primary winding P1 of the transformer T1, to supply to a control circuit 41. In the load detection circuit 31, a control signal applied to a control terminal (e.g., a gate terminal) of the switching element Q2 is smoothed through a resistor R9 and a capacitor C5 to output to the PFC on-off circuit 34. As the load power increases, a duty ratio of the switching element Q2 is increased, and hence the smoothed voltage is increased.

In the PFC on-off circuit 34, a voltage detected in the load detection circuit 31 is compared with a determination reference value (reference voltage), thereby monitoring or detecting power consumption by the load 5. When the power consumption is equal to or higher than a predetermined level, the load 5 is determined to be in a high load condition, and the PFC control circuit 32a becomes operative. When the power consumption is lower than the predetermined level, the load 5 is determined to be in a light load condition, and the PFC control circuit 32a becomes inoperative. When the PFC control circuit 32a is inoperative, power consumption in the control circuit is reduced. Since there are no more switching losses which may otherwise be caused by the switching element Q1 in the PFC, power efficiency of the entire switching power supply at light load is improved.

In the PFC on-off circuit 34, the determination reference value for use in determination of a state of the load 5 is corrected according to a representative voltage of the AC input voltage. When the load 5 is determined to be in a light-load condition based on a comparison between the corrected determination reference value and a detection output value of the load detection circuit 31, the PFC circuit 3a is controlled to be inoperative by the PFC on-off circuit 34. More specifically, when the PFC on-off circuit 34 determines that the boost voltage Vc3 detected by the auxiliary winding Ls is small and an AC input voltage is large, the circuit 34 decreases the determination reference value. When the circuit 34 determines that the boost voltage Vc3 is large and an AC input voltage is small, the circuit 34 increases the determination reference value.

Figure 8:
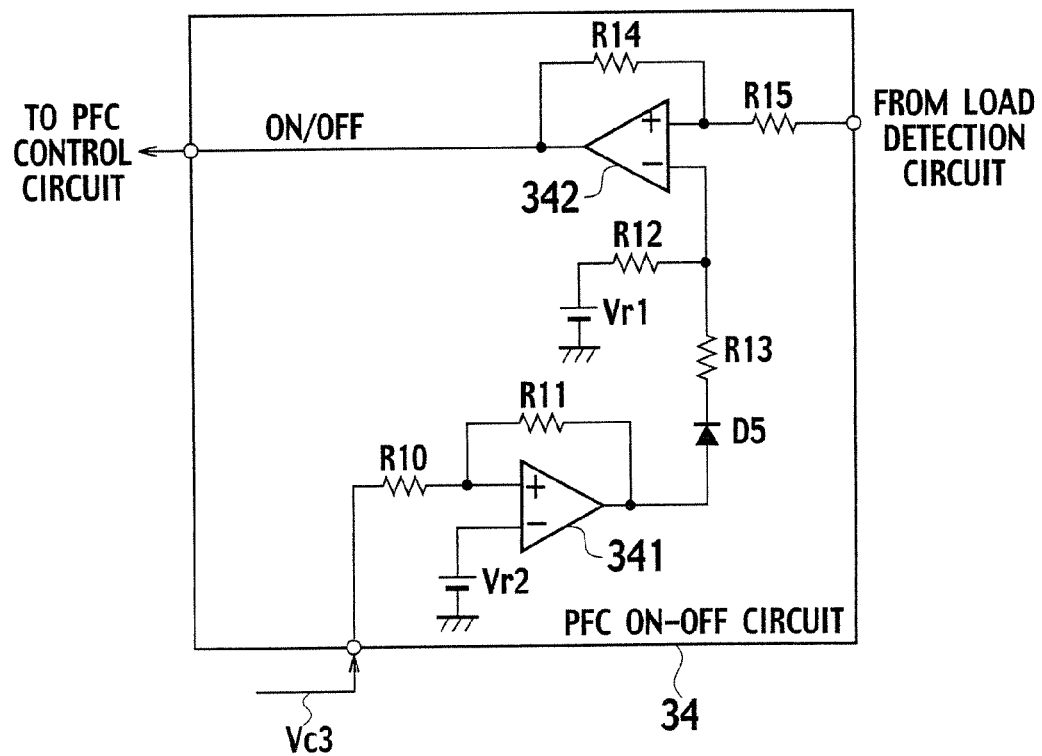
FIG. 8 shows a PFC on-off circuit of the first embodiment.

FIG. 8 shows a specific example of the PFC on-off circuit of the first embodiment. With reference to FIG. 8, a voltage source having reference voltage of Vr2 is connected to an inverting terminal of a comparator 341. A resistor R11 is connected between a non-inverting terminal and an output terminal of the comparator 341. One end of a resistor R10 is connected to the resistor R11, and the other end of the resistor R10 receives the boost voltage Vc3. The output terminal of the comparator 341 is connected to one end of the resistor R13 via a diode D5. The other end of the resistor R13 is connected to an inverting terminal of a comparator 342 and to one end of a resistor R12. The other end of the resistor R12 is connected to a positive side of a reference voltage source Vr1. A resistor R14 is connected between a non-inverting terminal and an output terminal of the comparator 342. One end of the resistor R14 is connected to the load detection circuit 31 via a resistor R15. The other end of the resistor R14 and the output terminal of the comparator 342 are connected to the PFC control circuit 32a.

According to this configuration, when the AC input voltage is small, that is, when the boost voltage Vc3 is large so that it exceeds the reference voltage Vr2, the diode D5 is turned on, thereby allowing a current to flow through the reference voltage source Vr1 as well as the resistors R13 and R12. Hence, a voltage (a determination reference value) larger than the reference voltage Vr1 is applied to the inverting terminal of the comparator 342. Therefore, the comparator 342 outputs an ON signal to the PFC control circuit 32a when an output from the load detection circuit 31 exceeds a large determination reference value. When an AC input voltage is large, that is, when the boost voltage Vc3 is small so that it is equal to or lower than the reference voltage Vr2, the diode D5 is turned off. Hence, the reference voltage Vr1 is applied to the inverting terminal of the comparator 342. Therefore, the comparator 342 outputs an ON signal to the PFC control circuit 32a when an output from the load detection circuit 31 exceeds the small determination reference voltage Vr1.

As described above, the determination reference value is decreased when an AC input voltage is determined to be large, while the determination reference value is increased when the AC input voltage is determined to be small. Therefore, the PFC on-off circuit 34 is capable of determining a load condition in a substantially identical load condition irrespective of variations of the AC input voltage.

A load power at which the determination is to be made intentionally can be arbitrarily varied in response to variations in an AC input voltage. For example, the reference voltage can be set such that the determination for a 115 VAC input is inverted at 40% load and that for a 230 VAC is inverted at 80% load.

In the PFC on-off circuit 34 of the present embodiment, the determination reference value is varied. Alternatively, an input voltage divider can be provided in the load detection circuit 31 so as to vary a detected smoothed voltage value of a duty ratio by changing a voltage dividing ratio for the input voltage divider.

The present embodiment employs a method of detecting a voltage that is proportional to the boost voltage Vc3 in the PFC as a method of detecting an input voltage. Therefore, when the AC input voltage is small, a voltage induced at the auxiliary winding Ls, that is, a voltage applied to input terminal of the PFC on-off circuit 34, is large. On the other hand, when the AC input voltage is large, a small voltage is applied to the input terminal of the PFC on-off circuit 34. Therefore, a setting circuit for setting an output voltage to a predetermined voltage should be configured to conform to a detector that directly or indirectly detects each of the small and large input voltages.

Second Embodiment

Figure 9:
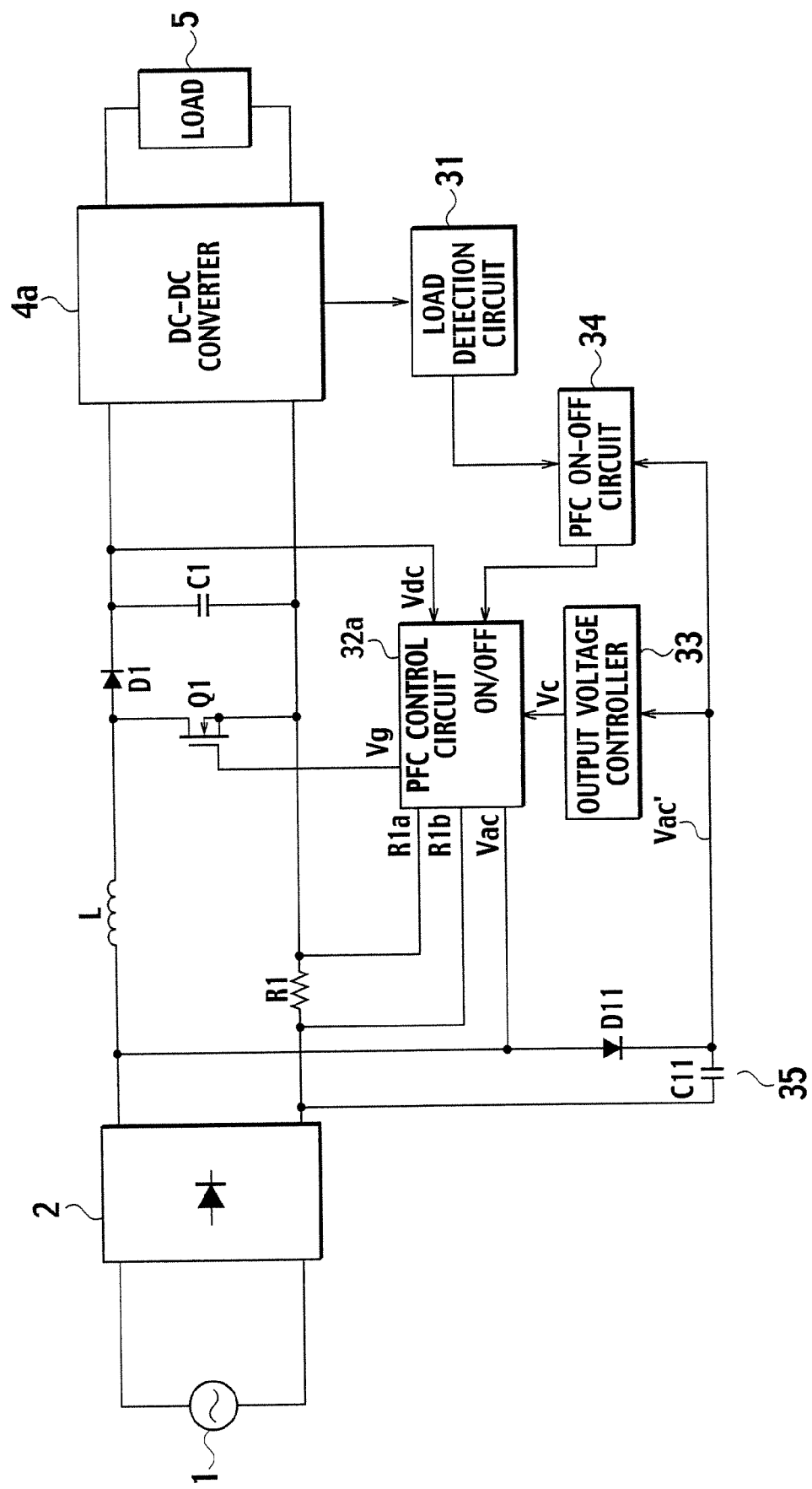
FIG. 9 is a circuit diagram of a switching power supply device according to a second embodiment of the present invention.

FIG. 9 is a circuit diagram of a switching power supply device according to a second embodiment of the present invention. In the switching power supply device of the second embodiment, an input terminal of the output voltage controller 33 and that of the PFC on-off circuit 34 are connected to output terminals of the rectifier 2 via an AC-DC converting circuit 35, thereby directly detecting the AC input voltage Vac. The AC-DC converting circuit 35 comprises a diode D11 and a capacitor C11. The output voltage controller 33 and the PFC on-off circuit 34 form an input voltage detection circuit. A DC voltage that is outputted via the AC-DC converting circuit 35 and that is proportional to the AC input voltage Vac is referred to as an AC input voltage Vac' below.

In the present embodiment, the input voltages to the output voltage controller 33 and to the PFC on-off circuit 34 increase as the AC input voltage Vac increases, and the input voltages to the output voltage controller 33 and to the PFC on-off circuit 34 decrease as the AC input voltage Vac decreases.

Figure 10:
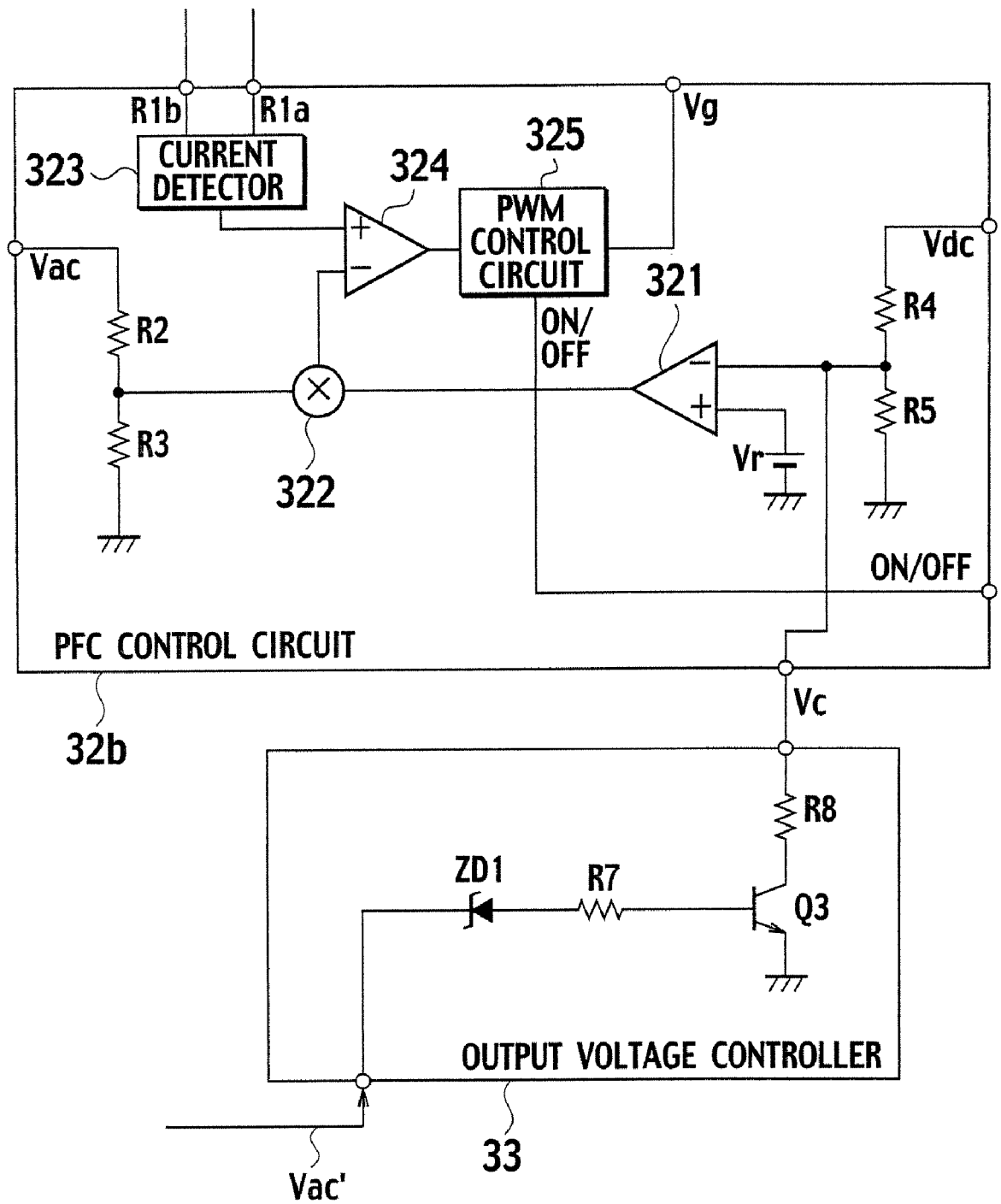
FIG. 10 shows a PFC control circuit and an output voltage controller of the second embodiment.

FIG. 10 shows a specific example of a PFC control circuit and an output voltage controller of the present embodiment. The second embodiment shown in FIG. 10 differs from the first embodiment only in the configuration of the PFC control circuit 32*b*. More specifically, the voltage source whose reference voltage is Vr is directly connected to the non-inverting terminal of the error amplifier 321, and one end of the resistor R8 is connected to an inverting terminal of the error amplifier 321 and a connection point between the resistors R4 and R5.

According to this configuration, when the AC input voltage Vac increases, the input voltage to the output voltage controller 33 also increases, and hence the transistor Q3 is turned on, which connects the resistor R8 to the resistor R5 in parallel. Consequently, the PFC output voltage Vdc to be inputted to the non-inverting terminal of the error amplifier 321 is increased in voltage dividing ratio, and hence a PFC output voltage is increased. On the other hand, when the AC input voltage Vac' decreases, the input voltage to the output voltage controller 33 also decreases, and the transistor Q3 is turned off. Consequently, the PFC output voltage Vdc to be input to the non-inverting terminal of the error amplifier 321 is decreased in the voltage dividing ratio, and hence the PFC output voltage is decreased.

Figure 11:
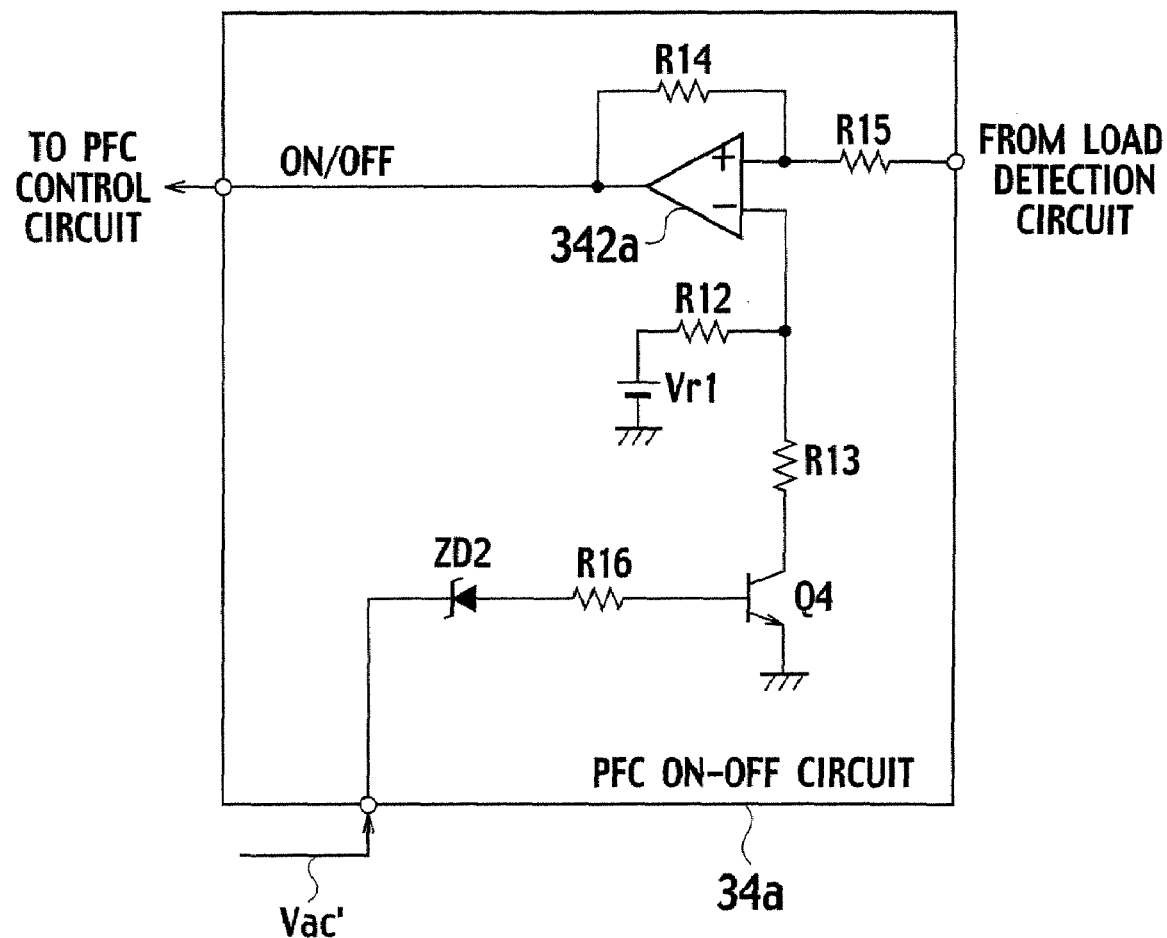
FIG. 11 shows a PFC on-off circuit of the second embodiment.

FIG. 11 shows a specific example of a PFC on-off circuit of the present embodiment. A PFC on-off circuit 34*a* differs from the PFC on-off circuit 34 of the first embodiment shown in FIG. 8 in that the transistor Q4 includes a collector connected to an inverting terminal of the comparator 342*a* via the resistor R13, a grounded emitter, and a base connected to an anode of a Zener diode ZD2 via a resistor R16, with a cathode of the Zener diode ZD2 receiving the AC input voltage Vac'.

According to this configuration, when the AC input voltage Vac increases, the transistor Q4 is turned on, thereby a current passes through a path extending along the reference voltage source Vr1, the resistors R12 and R13, and the transistor Q4. Accordingly, a fraction of the reference voltage Vr1 divided through the resistors R12 and R13 is applied to the inverting terminal of a comparator 342*a*. The voltage applied to the inverting terminal is a determination reference value. Therefore, the comparator 342*a* outputs an ON signal to the PFC control circuit 32*a* when an output value from the load detection circuit 31 exceeds a small determination reference value.

On the other hand, as the AC input voltage Vac decreases, the transistor Q4 is turned off, thereby applying the reference voltage Vr1 to the inverting terminal of the comparator 342*a*. The voltage applied to the inverting terminal is a determination reference value. Therefore, the comparator 342*a* outputs an ON signal to the PFC control circuit 32*a* when an output value from the load detection circuit 31 exceeds a large determination reference value.

As described above, since the determination reference value for making a determination of turning on and off of the PFC control circuit 32*a* is varied in accordance with an AC input voltage, the PFC circuit 3*a* can be turned on and off at a predetermined load power.

Operations of the circuits of the present embodiment other than those of the output voltage controller shown in FIG. 9 and the PFC on-off circuit shown in FIG. 10 are basically identical with those of the first embodiment, and hence descriptions thereof are omitted.

Third Embodiment

Figure 12:
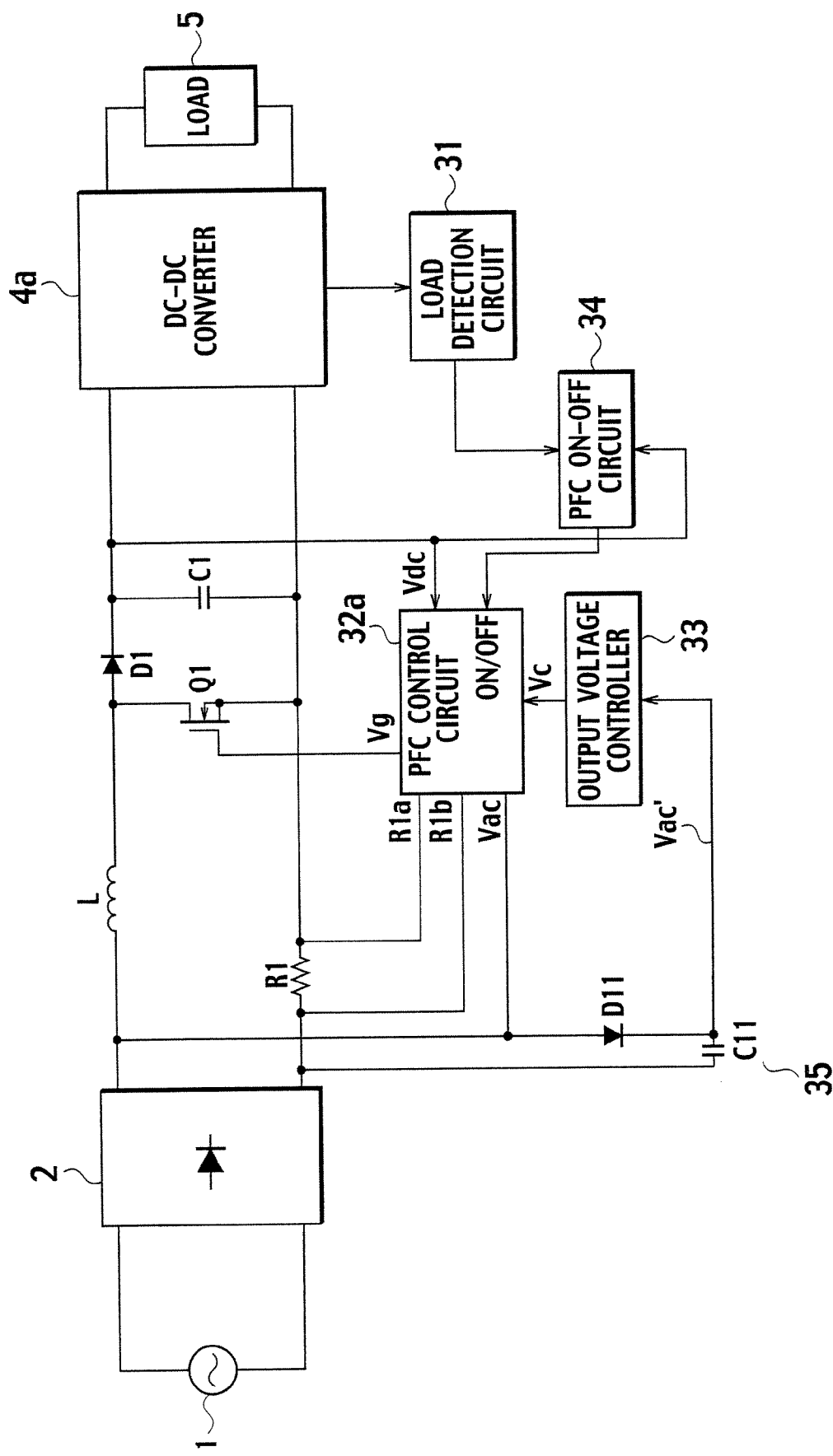
FIG. 12 is a circuit diagram of a switching power supply device according to a third embodiment of the present invention.

FIG. 12 is a circuit diagram of a switching power supply device according to a third embodiment of the present invention. In the switching power supply device of the third embodiment shown in FIG. 12, the AC input voltage Vac' outputted from the rectifier 2 is supplied to the input terminal of the output voltage controller 33, and an output voltage of the PFC circuit (the voltage across the capacitor C1), which varies depending on the AC input voltage Vac, is fed to the input terminal of the PFC on-off circuit 34*a*.

Since the output voltage controller 33 and the PFC on-off circuit 34*a* are identical with those of the second embodiment, operations of the third embodiment are similar with those of second embodiment. Accordingly, similar effects with those of the second embodiment are obtained.

Fourth Embodiment

Figure 13:
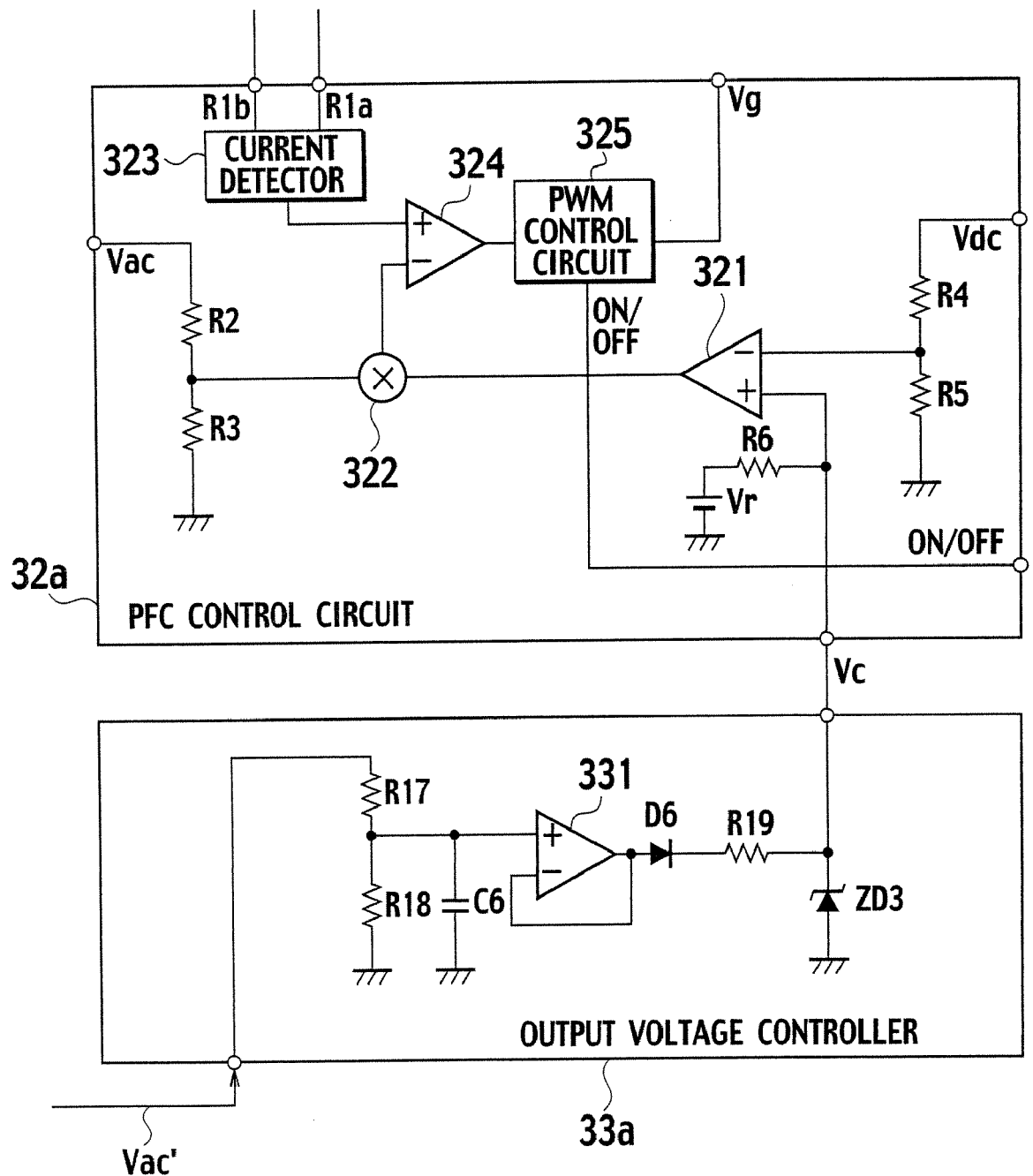
FIG. 13 shows a PFC control circuit and an output voltage controller of a fourth embodiment of the invention.
Figure 14:
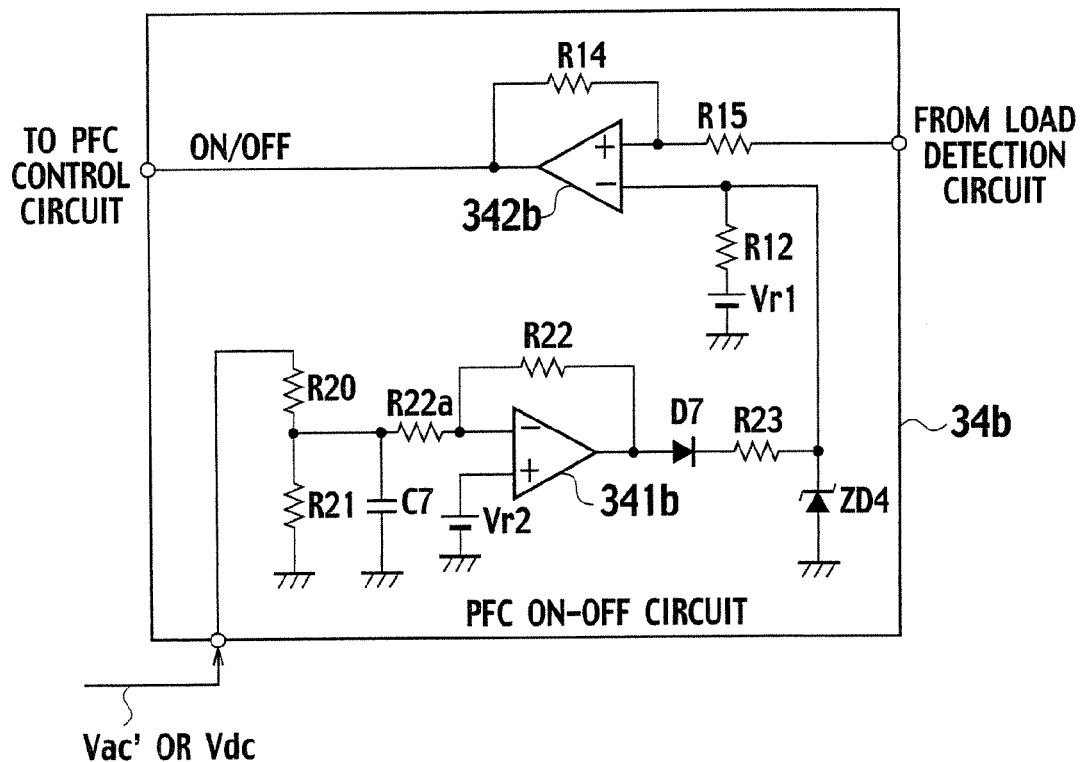
FIG. 14 shows a specific example of a PFC on-off circuit of the fourth embodiment.

FIG. 13 shows a specific example of a PFC control circuit and an output voltage controller of a fourth embodiment of the present invention. FIG. 14 shows a specific example of a PFC on-off circuit of the fourth embodiment.

In the switching power supply device of the present embodiment, the output voltage controller 33a shown in FIG. 13 and the PFC on-off circuit 34b shown in FIG. 14 continuously vary a PFC output voltage and a determination reference value for the PFC on-off circuit in accordance with an AC input voltage.

In the output voltage controller 33a shown in FIG. 13, one end of a resistor R17 receives the AC input voltage Vac', and the other end of the resistor R17 is connected to one end of a resistor R18, one end of a capacitor C6, and an input terminal of a buffer 331. The other end of the resistor R18 and the other end of the capacitor C6 are grounded. An output terminal of the buffer 331 is connected to its inverting terminal and an anode of a diode D6. A cathode of the diode D6 is connected to a cathode of a Zener diode ZD3, a non-inverting terminal of the comparator 321, and one end of the resistor R6 via a resistor R19.

According to this configuration, as the AC input voltage Vac increases, the voltage across the capacitor C6 also increases, thereby gradually increasing an output of the buffer 331. Consequently, a current passes through a path extending along the buffer 331, the diode D6, the resistor R19, the resistor R6, and the reference voltage source Vr, and hence a voltage applied to the non-inverting terminal of the comparator 321 which serves as an error amplifier is continuously increased.

Therefore, the PFC output voltage varies in proportion to the AC input voltage. For example, when a PFC output for 115 VAC input is 200 VDC, 400 VDC is output for 230 VAC, with the output voltages therebetween increasing substantially proportionally. A specific relationship between input voltages and PFC output voltages of the fourth embodiment on the assumption that a PFC output voltage at 115 VAC input is 200 VDC and that at 230 VAC input is 400 VDC can be expressed by $y=ax=1.74x$, where "y" is a PFC output voltage, "a" is a constant, and "x" is an effective value of an AC input voltage.

The relationship between y and x can be expressed by $y=ax+b$, so that general output voltages of approximately 250 VDC at 115 VAC and 380 VDC at 230 VAC are obtained. Alternatively, there can be adopted such a predetermined complicated function that varies a PFC output voltage so as to be switched between two predetermined values on the basis of an input voltage.

In the PFC on-off circuit 34b shown in FIG. 14, one end of a resistor R20 receives either the AC input voltage Vac' or the PFC output voltage Vdc, and the other end of the resistor R20 is connected one end of a resistor R21, one end of a capacitor C7, and one end of a resistor R22a. The other end of the resistor R22a is connected to an inverting terminal of a comparator 341b. The other end of the resistor R21 and the other end of the capacitor C7 are grounded. The reference voltage Vr2 is applied to a non-inverting terminal of the comparator 341b. An output terminal of the comparator 341b is connected to an inverting terminal of the same via the resistor R22, and also connected to an anode of the diode D7. A cathode of the diode D7 is connected to a cathode of a Zener diode ZD4, an inverting terminal of a comparator 342b, and one end of the resistor R12 via a resistor R23. The other end of the resistor R12 is connected to the positive side of the reference voltage source Vr1.

According to this configuration, as the AC input voltage Vac' or the PFC output voltage Vdc increases, the voltage of the capacitor C7 also increases while the output of the comparator 341b decreases. Since a current flowing through a path extending along the comparator 341b, the diode D7, the resistor R23, the resistor R12, and the reference voltage source Vr1 is decreased in amount, a voltage (the determination reference value) applied to the inverting terminal of the comparator 342b is continuously decreased. More specifically, the determination reference value can be continuously varied in accordance with the value of the AC input voltage Vac' or the PFC output voltage Vdc.

Fifth Embodiment

Figure 15:
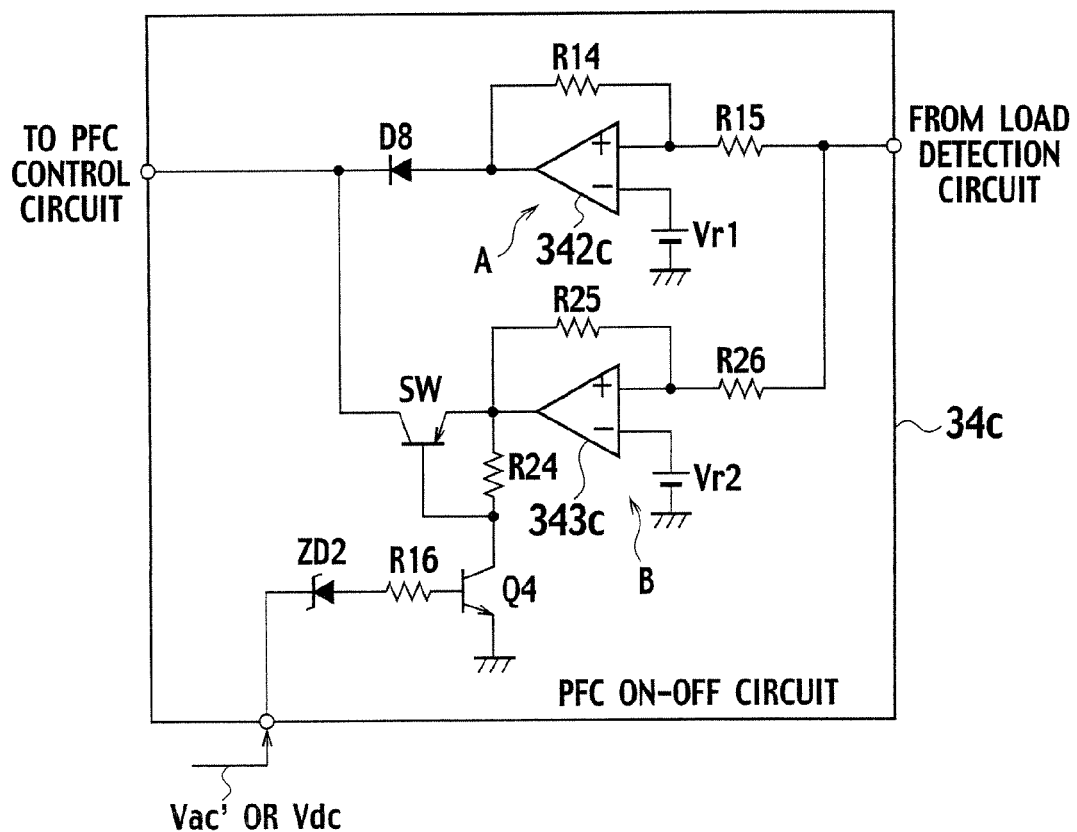
FIG. 15 shows a PFC on-off circuit of a fifth embodiment of the present invention.

FIG. 15 shows a specific example of a PFC on-off circuit of a fifth embodiment of the present invention. The PFC on-off circuit 34c of the fifth embodiment shown in FIG. 15 includes two PFC on-off units that detect an on/off state of the PFC circuit based on a load power.

The PFC on-off circuit 34c shown in FIG. 15 includes a first comparator A which has a first determination reference value for a 115 VAC input, and a second comparator B which has a second determination reference value for a 230 VAC input. The PFC on-off circuit 34c switches between an output of the first comparator A and an output of the second comparator B in accordance with the AC input voltage Vac' or the output voltage Vdc, and applies to the PFC control circuit 32a a signal for on-off switching of the PFC, thereby controlling on-off switching of the PFC circuit 3a.

The circuit configuration of the fifth embodiment is basically identical with that shown in the circuit diagram of the FIG. 9 or FIG. 12, and has the same load detection circuit and the same output voltage controller as those of the second to fourth embodiments.

In FIG. 15, either Vac' or the PFC output voltage Vdc is inputted to one end of the cathode of the Zener diode ZD2, the anode of the Zener diode ZD2 is connected to a base of the transistor Q4 via the resistor R16, and the emitter is grounded. The collector of the transistor Q4 is connected to one end of the resistor R24 and a base of a switch (transistor) SW having a transistor. The switch SW includes a collector connected to the PFC control circuit, and an emitter connected to an output terminal of a comparator 343c, one end of a resistor R25, and the other end of the resistor R24. The other end of the resistor R25 is connected to a non-inverting terminal of the comparator 343c and one end of a resistor R26. A voltage source whose reference voltage Vr2 is smaller than the voltage Vr1 is connected to an inverting terminal of the comparator 343c. The other end of the resistor R26 is connected to the load detection circuit 31.

One end of the resistor R15 is connected to the load detection circuit 31 and the other end of the resistor R26. The other end of the resistor R15 is connected to a non-inverting terminal of a comparator 342c and one end of a resistor R14. The comparator 342c includes an inverting terminal connected to the voltage source whose reference voltage is Vr1, and an output terminal connected to the other end of the resistor R14 and an anode of a diode D8. A cathode of the diode D8 is connected to the collector of the switch SW and the PFC control circuit 32a.

According to this configuration, when either the AC input voltage Vac' or the PFC output voltage Vdc is large, the transistor Q4 is turned on, thereby turning on the switch SW, and turning off the diode D8. Accordingly, the comparator 343c determines a load condition of the load detection circuit 31 based on the reference voltage Vr2, which is a smaller one of the determination reference values.

On the other hand, when either the AC input voltage Vac' or the PFC output voltage Vdc is small, the transistor Q4 is turned off, thereby turning off the switch SW. Consequently, the comparator 342c determines a load condition of the load detection circuit 31 based on the reference voltage Vr1, which is a larger one of the determination reference values.

It should be noted that the present invention is not limited to the switching power supply device described in each of the first to fifth embodiments, and can be a combination of any ones thereof. While in each of the embodiments, it is described that the PFC control circuit 32a includes the on-off terminal, when the PFC control circuit 32a is not provided with an on-off terminal, on-off switching of the PFC control circuit 32a can be effected by turning on and off a PFC control circuit power supply. When there are provided a plurality of terminals each capable of performing on-off switching of the PFC circuit as in the case of the fifth embodiment, independent connections to the respective terminals are also adaptable without switching among a plurality of PFC on-off output terminals.

While the embodiments have described examples of detecting a duty ratio of an output signal of the DC-DC converter control circuit to determine whether a load is light or heavy, a load condition can be detected based on a winding of a transformer that generates a control voltage for the DC-DC converter.

Figure 16:
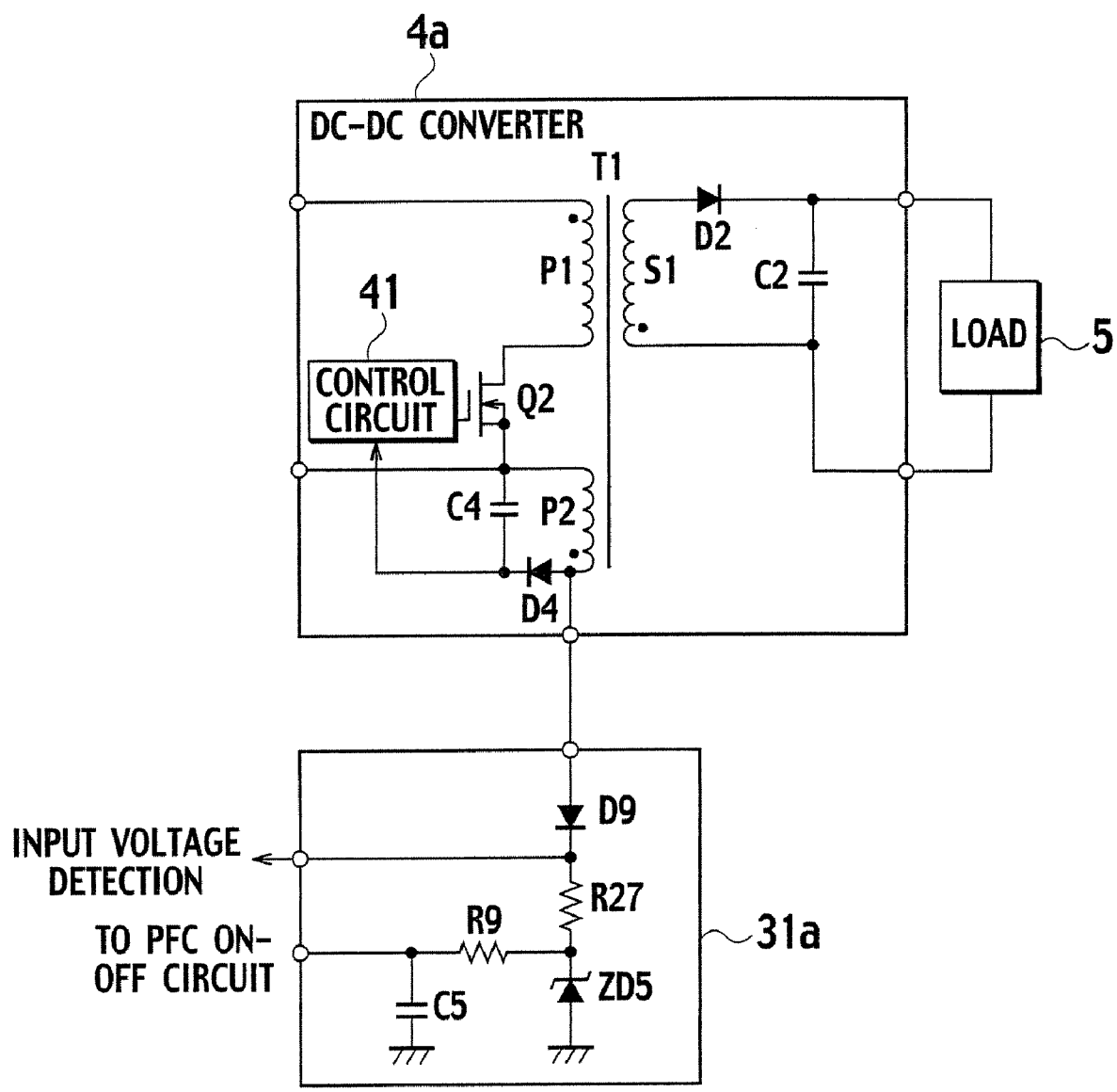
FIG. 16 shows a modification of a load detection circuit according to the present invention.

For example, as shown in FIG. 16, during a period when the switching element Q2 of the DC-DC converter 4a is turned on, a voltage proportional to an input voltage and a pulse width representing a duty ratio are induced at the transformer winding P2. Accordingly, the voltage induced at the winding P2 during the period when the switching element Q2 is turned on can be detected as the input voltage via the diode D9, and a duty ratio and a load power can be detected using the resistor R27, the Zener diode ZD5, the resistor R9, and the capacitor C5.

Figure 17:
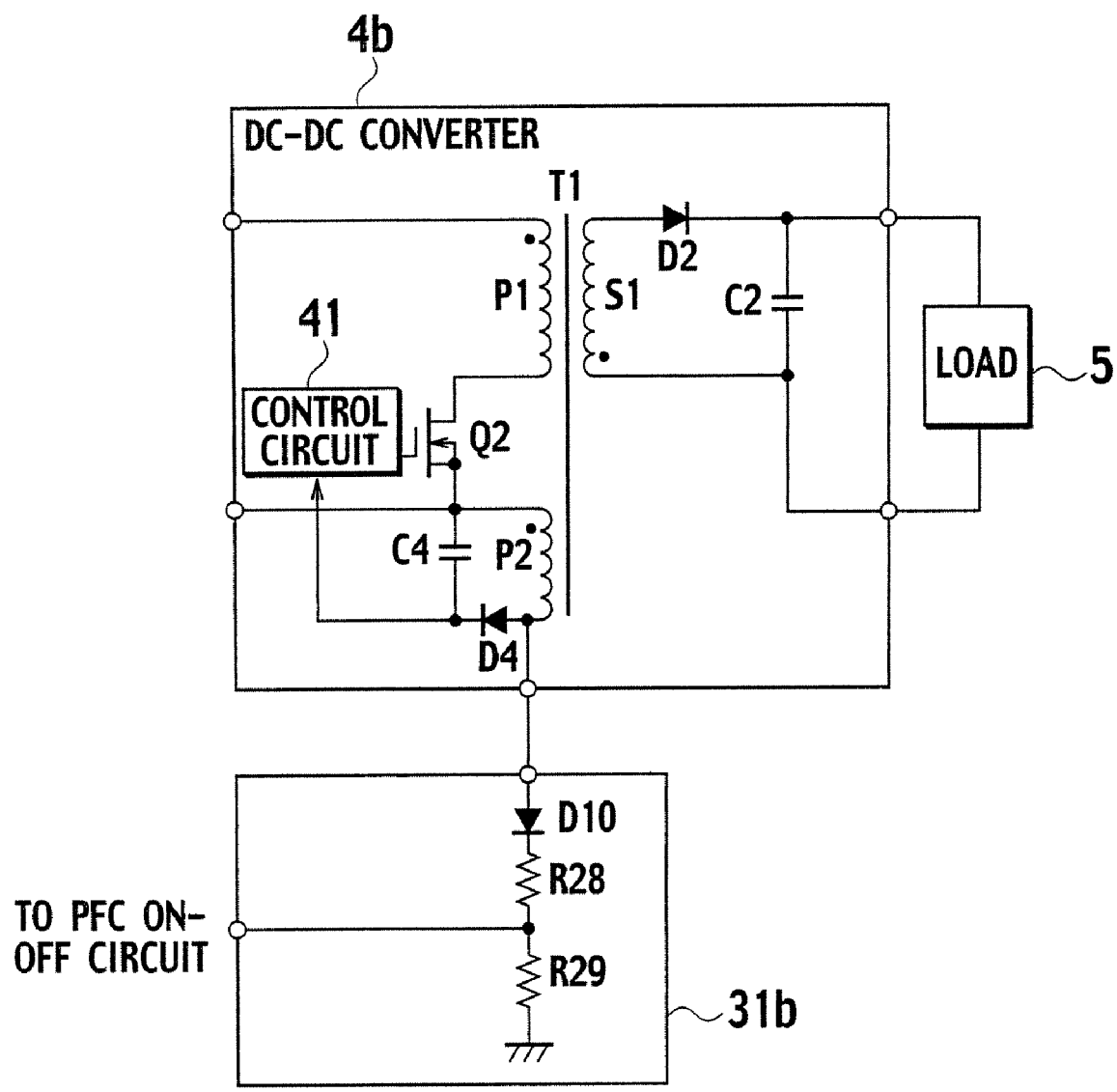
FIG. 17 shows another modification of the load detection circuit according to the present invention.

In a case of an RCC (ringing choke converter) circuit, as shown in FIG. 17, a voltage induced at the transformer winding P2 during an off-period of the switching element Q2 of the DC-DC converter 4b is generally proportional to an output voltage. As the load becomes larger, a resistance across the output winding S1, a resistance in the output circuit, and a voltage drop across the output rectifier increase the voltage induced at the transformer winding P2. It can be determined whether a load is light or heavy by detecting the voltage using the diode D10 and the resistors R28 and R29.

In order that an output voltage value of the DC-DC converter is a predetermined value, the output voltage is detected and a voltage of a feedback signal returned to the control circuit 41 of the DC-DC converter varies due to a load condition. Therefore, it can be determined whether the load is light or heavy by detecting the feedback signal.

Effect of the Invention

According to the present invention, even when using a method that a PFC DC output voltage is varied based on an AC input voltage to improve power conversion efficiency of the PFC circuit at a heavy load, since the AC input voltage is detected to correct a determination reference value in accordance with the AC input voltage, a light load condition can be detected appropriately over a range of all AC input voltages by performing power detection on the primary side where power loss is small due to the light load output for disabling the PFC circuit in a light-load condition. Accordingly, power conversion efficiency is improved irrespective of a level of an AC input voltage at both of heavy load and light load, and miniaturization and cost reduction are achieved.

This application claims benefit of priority under 35 USC §119 to Japanese Patent Applications No. 2005-378930, filed on Dec. 28, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power supply device comprising:
a boost power converter configured to convert an AC input voltage into a DC voltage larger than an amplitude of the AC input voltage to supply to a DC-DC converter;
a load detection circuit configured to detect a load condition of the switching power supply device;
an input voltage detection circuit configured to detect a representative voltage of the AC input voltage; and
a power conversion controller configured to control whether to enable or disable the boost power converter based on a comparison between the load condition and a first reference value, to adjust the first reference value according to the detected representative voltage of the AC input voltage, and to disable the boost power converter when the load condition is detected to be in a light load condition.

2. The switching power supply device according to claim 1, wherein, when the detected AC input voltage exceeds a second reference value, the power conversion controller is configured to correct the first reference value according to the AC input voltage.

3. The switching power supply device according to claim 1, wherein the input voltage detection circuit includes an auxiliary winding wound around a reactor that is included in the boost power converter, and is configured to detect a voltage induced at the auxiliary winding during a boost, thereby detecting a boost voltage in the reactor.

4. The switching power supply device according to claim 2, wherein the input voltage detection circuit includes an auxiliary winding wound around a reactor that is included in the boost power converter, and is configured to detect a voltage induced at the auxiliary winding during a boost, thereby detecting a boost voltage in the reactor.

5. The switching power supply device according to claim 1, wherein
the boost power converter is configured to output an output voltage corresponding to the AC input voltage; and
the input voltage detection circuit is configured to detect the output voltage of the boost power converter.

6. The switching power supply device according to claim 1, further comprising an output voltage controller configured to control an output voltage of the boost power converter according to the AC input voltage.

7. The switching power supply device according to claim 3, wherein the power conversion controller is configured to adjust the first reference value according to the detected boost voltage in the reactor.

8. The switching power supply device according to claim 1, wherein the power conversion controller is configured to disable the boost power converter when the load condition is detected to be in a light load condition based on whether the load condition exceeds the first reference value.

* * * * *